(12) United States Patent
Kusumoto

(10) Patent No.: US 11,563,864 B2
(45) Date of Patent: Jan. 24, 2023

(54) INFORMATION PROCESSING APPARATUS AND NON-TRANSITORY COMPUTER-READABLE STORAGE MEDIUM

(71) Applicant: BROTHER KOGYO KABUSHIKI KAISHA, Nagoya (JP)

(72) Inventor: Naoki Kusumoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/210,444

(22) Filed: Mar. 23, 2021

(65) Prior Publication Data

US 2021/0306482 A1 Sep. 30, 2021

(30) Foreign Application Priority Data

Mar. 31, 2020 (JP) .............................. JP2020-062762
Mar. 31, 2020 (JP) .............................. JP2020-062809

(51) Int. Cl.
*H04N 1/00* (2006.01)
*G06F 3/12* (2006.01)
*G10L 15/22* (2006.01)

(52) U.S. Cl.
CPC ....... *H04N 1/00403* (2013.01); *G06F 3/1204* (2013.01); *G06F 3/1253* (2013.01); *G10L 15/22* (2013.01); *G10L 2015/223* (2013.01)

(58) Field of Classification Search
CPC . H04N 1/00403; G06F 3/1204; G06F 3/1253; G10L 15/22; G10L 2015/223

USPC .......................................................... 358/1.13
See application file for complete search history.

(56) References Cited

U.S. PATENT DOCUMENTS

| | | | |
|---|---|---|---|
| 2006/0181750 A1* | 8/2006 | Lu | H04N 1/00567 358/1.13 |
| 2013/0253834 A1* | 9/2013 | Slusar | G01C 21/3608 701/540 |
| 2019/0272831 A1* | 9/2019 | Kajarekar | G10L 15/22 |
| 2020/0035217 A1* | 1/2020 | Chae | G10L 13/00 |
| 2020/0082829 A1* | 3/2020 | Taubman | G10L 15/22 |
| 2020/0126536 A1* | 4/2020 | Farivar | G06F 3/167 |
| 2020/0177746 A1* | 6/2020 | Katsumata | G06F 3/1238 |
| 2020/0227036 A1* | 7/2020 | Miller | G06V 20/597 |
| 2021/0297546 A1* | 9/2021 | Romero | G06F 21/6245 |

FOREIGN PATENT DOCUMENTS

| | | |
|---|---|---|
| JP | 2019-139674 A | 8/2019 |
| JP | 2020-21354 A | 2/2020 |

* cited by examiner

*Primary Examiner* — Allen H Nguyen
(74) *Attorney, Agent, or Firm* — Kenealy Vaidya LLP

(57) ABSTRACT

An application server recognizes a content of voice input to a smart speaker connected via a network interface. In a case where the recognized content of voice is a content indicative of a user's dissatisfaction or request for an image formed by a printer, the application server executes processing for determining an item of a setting parameter and a value thereof to be changed in the printer, based on the recognized content of voice, generates a command including the determined item and value of the setting parameter, and transmits the generated command to the printer.

16 Claims, 4 Drawing Sheets

FIG. 4

```
LOG INFORMATION
-------------------------------------
  1. UTTERANCE DATA 1-1: DATE AND TIME
  1-2: REGION
  1-3: RAW DATA
  1-4: EXTRACTED DATA
-------------------------------------
  2. PRINTER INFORMATION 2-1: PRINT APPLICATION INFORMATION
  2-2: PRINT SETTING
  2-3: MODEL INFORMATION
```

INFORMATION PROCESSING APPARATUS AND NON-TRANSITORY COMPUTER-READABLE STORAGE MEDIUM

CROSS-REFERENCE TO RELATED APPLICATION

This application is based upon and claims the benefit of priority from prior Japanese patent applications No. 2020-062762 and No. 2020-062809, filed on Mar. 31, 2020, the entire contents of which are incorporated herein by reference.

TECHNICAL FIELD

The present disclosure relates to technology of controlling an image forming apparatus by voice.

BACKGROUND

JP-A-2019-139674 discloses an electronic device configured to perform operation processing based on an instruction by a touch operation on a panel unit and an instruction by voice. JP-A-2020-021354 discloses a configuration of recording a user's operation history on an operation screen and changing the operation screen by using the operation history.

However, according to the electronic device disclosed in JP-A-2019-139674, an instruction by voice to change a value of a setting parameter of an image forming apparatus designates a value itself of the setting parameter. Therefore, in a case where a user does not understand well a relation between the value of the setting parameter and an image formation result, even when the image forming apparatus is caused to perform image formation with the value of the setting parameter after the instruction, there is a concern that an image will not be formed as intended by the user.

According to the configuration disclosed in JP-A-2020-021354, only the user operation information on the operation screen is collected as a log. Therefore, it is not possible to collect user's tastes and desires beyond the operation screen, as a log.

SUMMARY

An object of the present disclosure is to provide technology of changing a setting parameter by voice, which enables image formation as intended by a user.

Another object of the present disclosure is to provide technology of enabling a wide range of user's tastes and desires to be collected as a log.

One aspect of the present disclosure is an information processing apparatus including:
 a communication interface; and
 a controller,
 in which the controller is configured to recognize a content of voice input by utterance of a user of an image forming apparatus, the voice obtained from a smart speaker connected via the communication interface and configured to input and output voice, and
 in a case where the recognized content of voice is a content indicative of a user's dissatisfaction or request for an image formed by the image forming apparatus, the controller is configured to:
  execute processing for determining an item of a setting parameter and a value thereof to be changed in the image forming apparatus, based on the recognized content of voice;
  generate a command including the determined item and value of the setting parameter; and
  transmit the generated command to the image forming apparatus.

Another aspect of the present disclosure is an information processing apparatus including:
 a communication interface;
 a storage device; and
 a controller,
 in which the controller is configured to recognize a content of voice input by utterance of a user of an image forming apparatus, the voice obtained from a smart speaker connected via the communication interface and configured to input and output voice, and
 in a case where the recognized content of voice includes a term relating to a setting of the image forming apparatus, the controller is configured to:
  acquire setting information of the image forming apparatus from the image forming apparatus; and
  associate the recognized content of voice with the acquired setting information of the image forming apparatus to store the associated information in the storage device as log information relating to a setting of the image forming apparatus.

Note that, the technology disclosed herein can be implemented in a variety of forms, such as an information processing method, a control method of an image forming apparatus, a computer program for implementing functions of an apparatus or the method, a non-transitory computer-readable storage medium storing the computer program recorded thereon, and the like.

According to the technology of the above one aspect of the present disclosure, it is possible to form an image as intended by the user.

According to the technology of the above another aspect of the present disclosure, it is possible to collect the wide range of user's tastes and desires, as a log.

BRIEF DESCRIPTION OF DRAWINGS

FIG. 4 depicts an example of data that is stored as log information.

DETAILED DESCRIPTION

Hereinbelow, an exemplary embodiment of the above-described technology will be described in detail with reference to the drawings.

Figure 1:
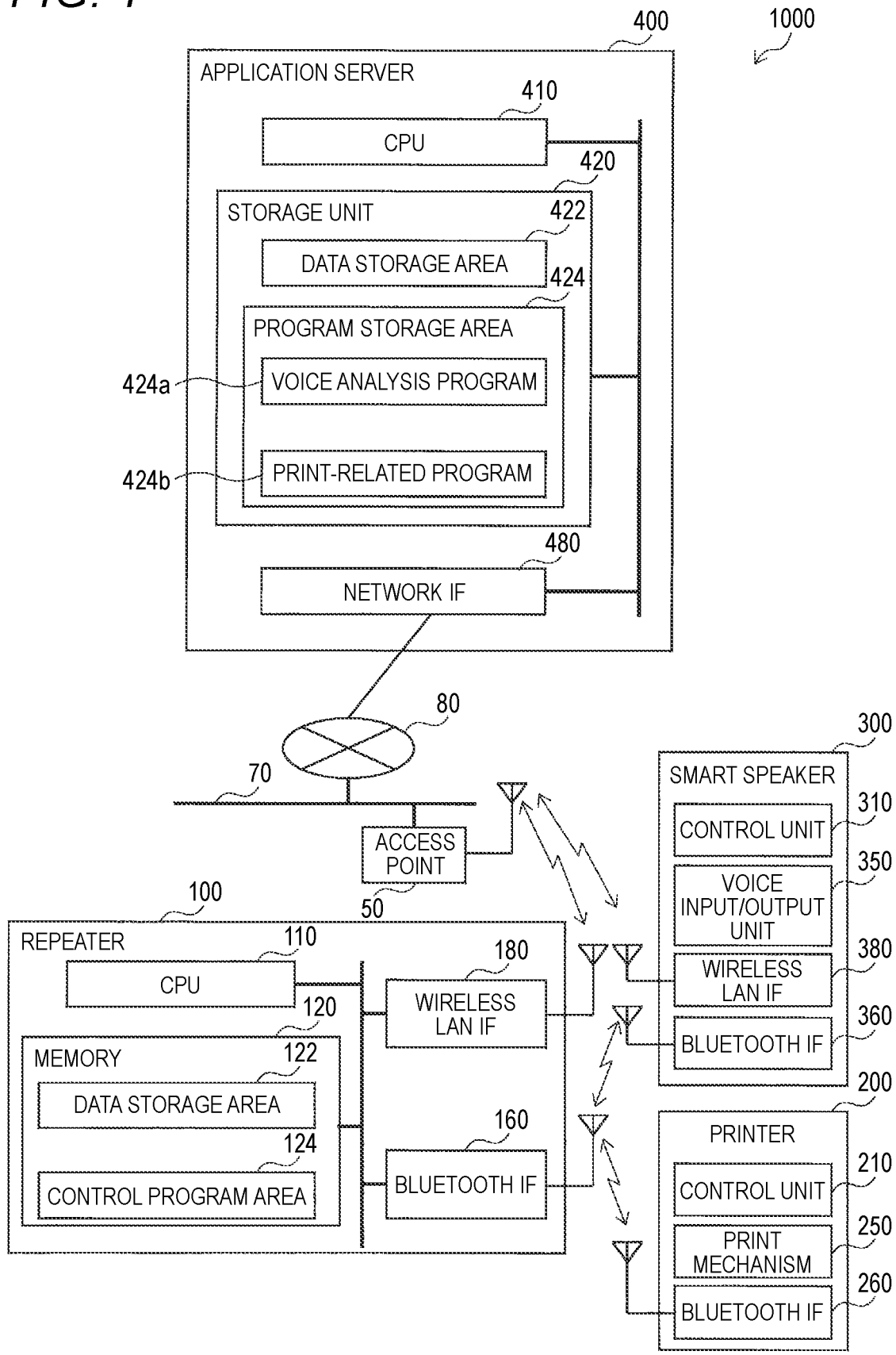
FIG. 1 is a block diagram depicting a configuration of an image forming system in accordance with one embodiment.

FIG. 1 depicts a configuration of an image forming system 1000 in accordance with one embodiment. The image forming system 1000 is mainly configured by a repeater 100, a printer 200, a smart speaker 300, and an application server 400. Note that, in the image forming system 1000 of the present embodiment, the repeater 100, the printer 200 and the smart speaker 300 are used by the same user.

An access point 50 that is used in the image forming system 1000 is configured to implement a function as an access point of a wireless LAN by using a communication method according to IEEE 802.11a/b/g/n standards, for example. The access point 50 is connected to a LAN 70. The LAN 70 is a wired network established in conformity to Ethernet (registered trademark), for example. The LAN 70 is connected to the Internet 80. The application server 400 is connected to the Internet 80.

The repeater 100 is an apparatus configured to relay data that is transmitted and received between the application server 400 and the printer 200. The repeater 100 mainly includes a CPU 110 for controlling the entire repeater 100, a memory 120 such as a ROM, a RAM, an NVM and the like, a Bluetooth (registered trademark) IF 160 for performing P2P communication with the printer 200, and a wireless LAN IF 180 for communicating with the application server 400. The repeater 100 is configured by, for example, a mobile terminal such as a smartphone. Note that, the NVM is an abbreviation of non-volatile memory, P2P is an abbreviation of Peer to Peer, and IF is an abbreviation of Interface.

The memory 120 includes a data storage area 122 and a control program storage area 124. The data storage area 122 is an area in which data and the like necessary for the CPU 110 to execute a control program and the like are stored. The control program storage area 124 is an area in which an OS, a control program, firmware and the like are stored.

The Bluetooth IF 160 is an interface that includes an antenna and is configured to perform short-range wireless communication in conformity to the Bluetooth method. The repeater 100 is communicatively connected to the printer 200 via the Bluetooth IF 160. The wireless LAN IF 180 includes an antenna, and is configured to perform wireless communication by using a communication method according to IEEE 802.11a/b/g/n standards, for example. Thereby, the repeater 100 is connected to the LAN 70 and the Internet 80 via the access point 50, and is communicatively connected to the application server 400. Note that, in a case where the printer 200 includes a wireless LAN IF, the repeater 100 may be communicatively connected to the printer 200 via the wireless LAN IF 180.

The printer 200 includes a control unit 210 including a CPU and a memory, a print mechanism 250 configured to perform printing according to control of the control unit 210, and a Bluetooth IF 260, for example. The print mechanism 250 is a mechanism configured to print an image on a sheet, and is a print mechanism of an electrophotographic method, an inkjet method, a thermal method or the like. The Bluetooth IF 260 is an interface that includes an antenna and is configured to perform short-range wireless communication in conformity to the Bluetooth method, and is used for communication with the repeater 100, as described above. Note that, the printer 200 may include a wireless LAN IF, instead of the Bluetooth IF 260, and may be communicatively connected to the repeater 100.

In a case where the printer 200 does not include a wireless LAN IF, the printer 200 is communicatively connected to the repeater 100 but cannot directly communicate with the application server 400.

The smart speaker 300 is a device configured to execute specific processing, in response to voice uttered by a user. The specific processing includes, for example, processing of generating and transmitting voice data to the application server 400. The smart speaker 300 includes a control unit 310 including a CPU and a memory, a voice input/output unit 350, a Bluetooth IF 360, and a wireless LAN IF 380.

The voice input/output unit 350 includes a speaker and a microphone, and is configured to execute processing relating to an input of voice and an output of voice. For example, the voice input/output unit 350 is configured to detect voice uttered by the user and to generate voice data indicative of the voice, under control of the control unit 310. The voice input/output unit 350 is also configured to generate voice corresponding to the received voice data, from the speaker.

The wireless LAN IF 380 includes an antenna and is configured to perform wireless communication by using a communication method according to IEEE 802.11a/b/g/n standards, for example. Thereby, the smart speaker 300 is connected to the LAN 70 and the Internet 80 via the access point 50, and is communicatively connected to the application server 400.

The application server 400 is, for example, a server that is operated by a business operator that provides a so-called cloud service. The application server 400 includes a CPU 410 configured to control the entire application server 400, and a storage unit 420 including a ROM, a RAM, an HDD, an SSD, an optical disk drive, and the like. The application server 400 further includes a network IF 480 for connection to the Internet 80. Note that, although the application server 400 is conceptually shown as one server in FIG. 1, the application server 400 is a so-called cloud server including a plurality of servers communicatively connected to each other.

The storage unit 420 includes a data storage area 422 and a program storage area 424. The data storage area 422 is a storage area in which data and the like necessary for the CPU 410 to execute processing are stored, and functions as a buffer area in which a variety of intermediate data, which is generated when the CPU 410 executes processing, are temporarily stored. The program storage area 424 is an area in which an OS, an information processing program, a variety of other applications, firmware and the like are stored. The information processing program includes a voice analysis program 424a and a print-related program 424b. The voice analysis program 424a is uploaded and provided to the application server 400 by an operator of the application server 400, for example. The print-related program 424b is uploaded and provided to the application server 400 by a business operator that provides a print service by using resources of the application server 400, for example, a business operator that manufactures the printer 200. Note that, all or some of the voice analysis program 424a may also be provided by the business operator that manufactures the printer 200, for example. Alternatively, all or some of the print-related program 424b may also be provided by the business operator that operates the application server 400.

The application server 400, particularly, the CPU 410 is configured to function as a voice analysis processing unit 424a' (refer to FIG. 2) by executing the voice analysis program 424a. The voice analysis processing unit 424a' is configured to execute voice recognition processing and morpheme analysis processing. The voice recognition processing is processing of analyzing voice data to generate text data indicative of a content of utterance indicated by the voice data. The morpheme analysis processing is processing of analyzing the text data to extract structural units (called morphemes) of words included in the content of utterance and to specify types of the extracted morphemes (for example, types of parts of speech).

The application server 400, particularly, the CPU 410 is also configured to function as a print-related processing unit 424b' (refer to FIG. 2) by executing the print-related program 424b. The print-related processing unit 424b' is configured to execute processing of generating a command for instructing the printer 200 to operate by using the text data obtained as a result of the analysis of the voice data, for example.

Figure 2:
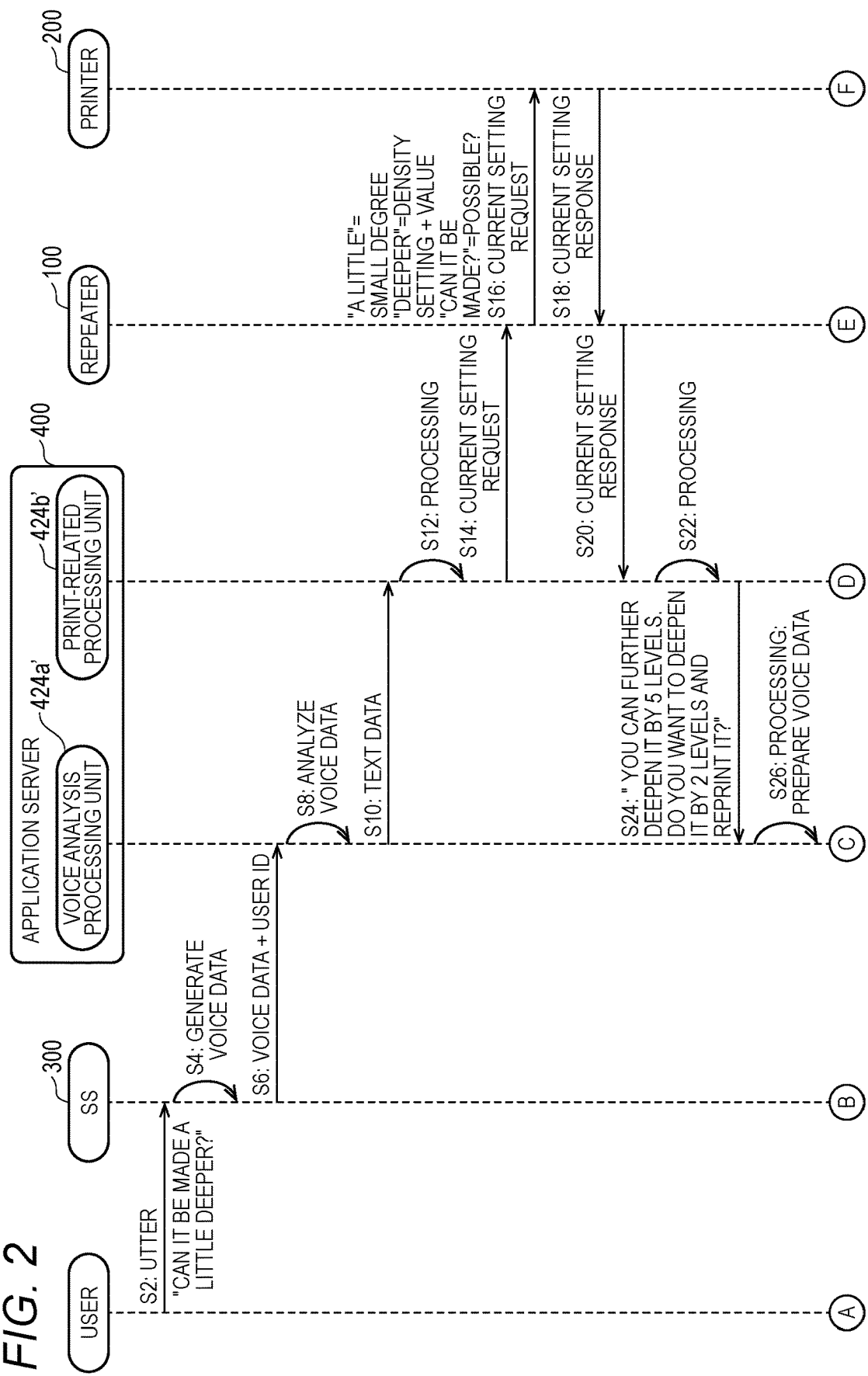
FIG. 2 is a sequence diagram of print control processing that is executed by the image forming system shown in FIG. 1.
Figure 3:
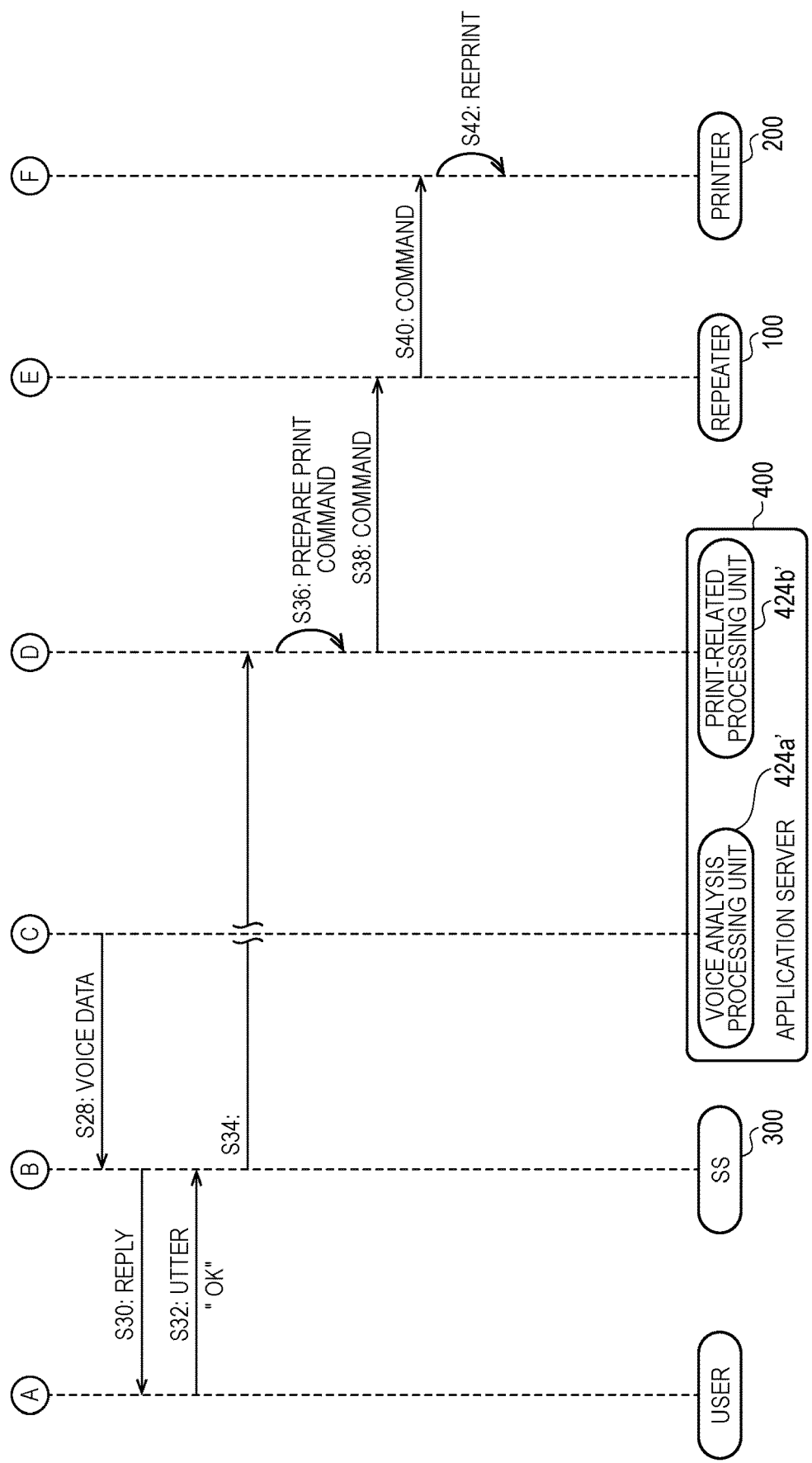
FIG. 3 is a sequence diagram continuing to the sequence diagram shown in FIG. 2.

FIGS. 2 and 3 depict sequences of print control processing that is executed by the image forming system 1000. The print control processing is processing in which the smart speaker 300 and the application server 400 cooperate with each other to cause the printer 200 to execute printing.

The print control processing shown in FIGS. 2 and 3 shows processing after predetermined pre-processing is executed. In the pre-processing, a user first accesses the smart speaker 300 by using a terminal apparatus not included in the image forming system 1000, such as a smartphone, a PC or the like, and registers a user ID and a voiceprint on the memory in the control unit 310. Then, the user sets the repeater 100, the printer 200 and the smart speaker 300 so that data is correctly transmitted and received between the application server 400 and the printer 200. The user also instructs the printer 200 on printing by using a print application installed in the terminal apparatus. The pre-processing is executed, so that the user receives a print result from the printer 200 and is in a state of being dissatisfied with or having a request for the print result.

In FIG. 2, the user utters in S2. Since the user felt that the print result was a little paler than the user's intended density, the user asks the smart speaker 300 "Can it be made a little deeper?", for example. The print control processing starts when the smart speaker 300 detects the uttered voice.

In S4, the smart speaker 300 generates voice data indicating the voice uttered by the user. That is, when the voice "Can it be made a little deeper?" is input to the smart speaker 300, the smart speaker 300 generates voice data indicating the voice.

Then, in S6, the smart speaker 300 transmits the voice data and the registered user ID to the voice analysis processing unit 424a' of the application server 400. The voice data is transmitted using a well-known protocol, for example, HTTP.

When the application server 400 receives the voice data and the user ID, in S8, the voice analysis processing unit 424a' of the application server 400 analyzes the received voice data. Specifically, the voice analysis processing unit 424a' executes the voice recognition processing on the voice data to generate text data indicative of the voice indicated by the voice data. For example, when the voice data indicating the voice "Can it be made a little deeper?" is received, the voice analysis processing unit 424a' generates text data indicative of a content of the voice. The voice analysis processing unit 424a' further executes the morpheme analysis processing on the text data. Thereby, from the generated text data, for example, words such as "a little", "deeper" and "Can it be made?" are extracted and types (for example, noun and verb) of parts of speech of the words are specified. The voice analysis processing unit 424a' generates a list in which the extracted words are associated with the types of parts of speech, as a morpheme analysis result.

Then, in S10, the voice analysis processing unit 424a' transfers the generated text data, the morpheme analysis result, and the user ID received from the smart speaker 300 to the print-related processing unit 424b'. Specifically, the voice analysis processing unit 424a' stores the text data, the morpheme analysis result and the user ID in a predetermined area of the data storage area 422, for example, and calls the print-related program 424b.

When the text data, the morpheme analysis result and the user ID are received from the voice analysis processing unit 424a', in S12, the print-related processing unit 424b' executes processing of determining a content to be executed next time by using the text data and the morpheme analysis result. Specifically, the print-related processing unit 424b' recognizes that a change of 'what' is small, from the word "a little", that 'what' is that an item of the setting parameter is a density parameter and a further change direction is an increase direction, from the word "deeper", and that the user asks whether it is possible, from the words "can it be made". From the recognition result, the print-related processing unit 424b' recognizes that an utterance content of the user is "the value of the density parameter is to be increased in a little deeper direction than the current value", and thus determines that the user inquires of the printer 200 about a current setting value of the density parameter. Then, the print-related processing unit 424b' generates a command (hereinbelow, referred to as "current setting request command") for inquiring about a current setting value of the density parameter.

Then, in S14, the print-related processing unit 424b' transmits the current setting request command to the repeater 100. In S16, the repeater 100 transmits the received current setting request command to the printer 200, as it is.

When the current setting request command is received, the printer 200 transmits a response (hereinbelow, referred to as "current setting response") including a current setting value of the density parameter and a model name of the printer 200 to the repeater 100, in S18.

In S20, the repeater 100 transmits the received current setting response to the application server 400, as it is. The print-related processing unit 424b' of the application server 400 executes processing based on the received current setting response, in S22. Specifically, for example, it is assumed that the current setting value "5" of the density parameter is included in the current setting response. The application server 400 stores, for example, information of all setting parameters for each of the diverse image forming apparatuses including the printer 200, in the data storage area 422. The print-related processing unit 424b' acquires a maximum value that can be set as the density parameter, from the information of all the setting parameters of the image forming apparatus, i.e., the printer 200 matching the model name included in the current setting response. If it is assumed that the maximum value is, for example, "10", the print-related processing unit 424b' can perceive that the value of the density parameter can be further increased by "5" levels from the current value "5". Therefore, the print-related processing unit 424b' generates text data that is a basis of voice data for notifying the same. For example, the print-related processing unit 424b' selects "5" and "can be deepened", and "2" for a small degree, and generates text data "You can further deepen it by 5 levels. Do you want to deepen it by 2 levels and reprint it?" Then, the print-related processing unit 424b' transfers the generated text data to the voice analysis processing unit 424a', in S24.

Then, in S26, the voice analysis processing unit 424a' prepares voice data, based on the text data. Then, the voice analysis processing unit 424a' transmits the prepared voice data to the smart speaker 300, in S28 of FIG. 3.

Then, in S30, the smart speaker 300 generates the received voice data, as voice. The user who hears the voice utters "OK", for example, in S32. The user may also utter "Deepen it only by 1 level", for example. In response to this, the smart speaker 300 and the voice analysis processing unit 424a' execute processing similar to S4 to S10, and generate and transfer text data to the print-related processing unit 424b'.

In S36, the print-related processing unit 424b' prepares a command, based on the text data. Specifically, in a case of 2 levels, the print-related processing unit 424b' generates a command to instruct reprint with setting the value of the density parameter to the current setting value+2, i.e., 7. Then, the application server 400 transmits the generated command to the repeater 100, in S38. The repeater 100 transmits the received reprint command to the printer 200, as it is, in S40. In S42, the printer 200 controls the print mechanism 250 with the setting value of the density parameter according to the received reprint command, thereby executing reprint based on print data used for previous print and stored in the control unit 210.

When transmitting the print command to the repeater 100 in S38, the print-related processing unit 424b' may generate text data becoming a basis of voice data for notifying that the printer 200 is instructed to execute the reprint, and may transfer the same to the voice analysis processing unit 424a'. Thereby, since voice indicating that the printer 200 is instructed to execute the reprint is generated from the smart speaker 300, the user can know in advance that a reprint result will be output from the printer 200.

When dissatisfied with the reprint result, the user again utters a dissatisfaction content to the smart speaker 300. In response to this, the processing of S4 to S42 is repeated, so that the print result is output several times from the printer 200.

Note that, the printer 200 is configured to change the setting value of the density parameter. However, there are other printers that cannot change the setting value of the density parameter. In this case, the print-related processing unit 424b' may generate text data becoming a basis of voice data for notifying that the setting cannot be changed, and transfer the same to the voice analysis processing unit 424a'.

In the present embodiment, since the user asks "Can it be made a little deeper'?" in S2, the answer "You can further deepen it by 5 levels. Do you want to deepen it by 2 levels and reprint it?" is returned to the user in S30. Instead, the processing of S22 to S34 may be omitted, the processing may be caused to proceed from S20 to S36 without replying to the user, and a command to instruct reprint with adding a value, which is determined in a slightly increasing direction from "a litter", to the current value of the density parameter determined from "deep".

Note that, in the present embodiment, the utterance content of the user and the content of the voice generated from the smart speaker 300 are just exemplary. The determined item of the setting parameter is not limited to the density parameter, and diverse items of the setting parameters are determined according to utterance contents of the user. The parameter value is not also limited to the change in the increase direction, and may be changed in a decrease direction. The parameter value may not be changed.

In this way, according to the image forming system 1000 of the present embodiment, when the user who is dissatisfied with or has a request for a print result from the printer 200 simply utters the dissatisfaction or the content of the request to the smart speaker 300, an item of the setting parameter and a value thereof are automatically determined so that a print result to resolve the dissatisfaction or a print result to meet the request is obtained, and the print control on the printer 200 is performed, so that an image can be formed as intended by the user. In particular, a user who does not understand well a relation between a value of the setting parameter to be changed and a print result does not need to directly instruct an item of the setting parameter and a parameter value, which is useful.

When the user simply utters an intuitive impression on a print result, the print setting is changed and a print result is thus obtained as intended by the user. Therefore, the user can intuitively change the print setting. As a result, the user does not have to search the print application for a print setting with which a print result is obtained as intended by the user. A change to a new print setting that is not included in the print settings registered in advance in the print application may be possible.

In the image forming system 1000 of the present embodiment, since the application server 400 generates the command that is to be transmitted to the printer 200, based on the analysis on the utterance content of the user, a variety of the smart speakers 300 can be adopted. That is, there is no model dependency. Since the repeater 100 also simply relays data that is transmitted and received between the application server 400 and the printer 200, as it is, any repeater can be used as long as it can relay data. That is, there is no model dependency.

FIG. 4 depicts an example of a format of log information that is stored in the storage unit 420 by the print-related processing unit 424b' of the application server 400. When the user utters to the smart speaker 300, the print-related processing unit 424b' acquires log information each time the user utters, and stores the same in the storage unit 420. As shown in FIG. 4, "1. UTTERANCE DATA" and "2. PRINTER INFORMATION" are associated with each other to be stored as the log information.

As "1. UTTERANCE DATA", "1-1: date and time", "1-2: REGION", "1-3: RAW DATA" and "1-4: EXTRACTED DATA" are acquired. "DATE AND TIME" is date and time at which the user utters. "REGION" is a region in which the user utters. Region may be any unit such as a national unit, a prefecture unit, a municipal unit and a finer unit. For example, "REGION" may be determined based on position information obtained from a GPS mounted to the smart speaker 300. "RAW DATA" is voice data itself input from the smart speaker 300. "EXTRACTED DATA" is text data generated as described above and a morpheme analysis result generated as a result of the morpheme analysis processing on the text data.

As "2. PRINTER INFORMATION", "2-1: PRINT APPLICATION INFORMATION". "2-2: PRINT SETTING" and "2-3: MODEL INFORMATION" are acquired. "PRINT APPLICATION INFORMATION" is information of the print application that is used in the pre-processing of the print control processing shown in FIGS. 2 and 3. The information of the print application may be inquired to a terminal apparatus in which the print application is installed. Alternatively, in a case where the printer 200 stores the information of the print application used for printing, the information of the print application may also be inquired when transmitting the current setting request command in S14. "PRINT SETTING" is a print setting set in the printer 200 upon utterance. In S14, only the information of the setting parameter related to the utterance content uttered in S2 is requested. However, the setting information of all the setting parameters may also be requested, "MODEL INFORMATION" is a model name of the printer 200. In S18, since the printer 200 generates the current setting response including a model name, the model name is preferably used. Note that, "PRINT SETTING" may be all or some of the print settings set in the printer 200. Some of the print settings may include one print setting. In this case, one print setting that is closely related to the utterance content may be selected.

Further, the log information is classified into log information in which terms relating to the settings of the printer 200 are included in the utterance data and log information in which the terms relating to the settings of the printer 200 are not included, and is stored for each type. When the log information is stored in this way, the log information can be used for each type, which is convenient. Note that, it is possible to immediately determine whether the terms relating to the settings of the printer 200 are included, based on "1-1: EXTRACTED DATA".

The log information acquired in this way is used so as to reflect the same on future product development with knowing the wide range of user's tastes and desires for the printer 200. In the related art, a user operation on a UI screen of the print application is stored as an operation log. However, a range in which the user can perceive what the user wants to do (Want) is limited. For example, in a case where the setting value of the density parameter is set to the maximum value, it is difficult for the user to determine from the operation log whether the user is satisfied with the setting value or wants a deeper result. On the other hand, in a case where the user's utterance is "I want a deeper result" or "It is still pale" and this has been collected as the log information, it can be seen that the user's Want is Want beyond the settable range of the apparatus. In this way, the wide range of user's tastes and desires can be seen from the log information of the present embodiment.

Note that, it is also considered to store information that is a text version of voice data, as the log information. However, in this case, it is difficult to understand later that the user uttered based on what basis. Therefore, in the present embodiment, the information about the setting and the like of the printer and the utterance information are associated with each other to be stored as the log information. Thereby, the accuracy of perceiving user's Want is highly improved and the usefulness as the log information is also highly improved.

In addition, as a method of perceiving the user's tastes and desires, there is a method of providing a user's desire field on a printer support site and enabling a user to freely write a desire therein. The user's tastes and desires obtained by the method may include a bias. This is because only tastes and desires from users who are willing to write positively are obtained. In contrast, from the log information obtained by the method as described in the present embodiment, a wide range of tastes and desires from users who have no bias can be obtained. For this reason, the log information can be reflected on business expansion such as provision of services corresponding to Want of a wide range of users and next product development.

As described above, the application server 400 in accordance with one aspect of the present embodiment includes the network IF 480, and the CPU 410. The CPU 410 recognizes a content of voice input by utterance of the user of the printer 200, from the smart speaker 300 connected via the network IF 480 and configured to input and output voice (S8). When the recognized content of voice is a content indicating a user's dissatisfaction or request for an image formed by the printer 200, the CPU 410 determines an item of the setting parameter and a value thereof to be changed in the printer 200, based on the recognized content of voice (S12), generates a command including the determined item of the setting parameter and value thereof (S36), and transmits the generated command to the printer 200 (S38).

In this way, in the application server 400 of the present embodiment, even though the user does not directly instruct an item of the setting parameter and a parameter value, it is possible to form an image as intended by the user.

Additionally, in the present embodiment, the application server 400 is an example of the "information processing apparatus". The network IF 480 is an example of the "communication interface". The CPU 410 is an example of the "controller". The printer 200 is an example of the "image forming apparatus".

The CPU 410 also acquires the current setting value of the determined setting parameter item in the printer 200 from the printer 200 (S20), and determines a value of the determined setting parameter item, based on the acquired current setting value and the recognized content of voice (S22).

Thereby, the value of the setting parameter is automatically determined, which is convenient.

The CPU 410 also compares a settable maximum or minimum value of the determined setting parameter item and the acquired current setting value before determining a value of the determined setting parameter item, transmits voice data pronouncing a range of values that can be added to or subtracted from the current setting value to the smart speaker 300 via the network IF 480 (S28). In response to this, when the user pronounces a value to be added to or subtracted from the current setting value, the CPU 410 recognizes a value to be added to or subtracted from the current setting value, and determines, as a value of the determined setting parameter item, a value obtained by adding or subtracting the recognized value to or from the current setting value (S36).

Thereby, the user can instruct a value of the setting parameter simply by pronouncing a value to be added to or subtracted from the current setting value, which is convenient.

When the current setting value cannot be acquired from the printer 200, the CPU 410 also transmits voice data pronouncing that the current setting value cannot be acquired to the smart speaker 300 via the network IF 480.

Thereby, the user can know by voice whether the printer 200 can change the setting value, which is convenient.

When the recognized content of voice is a content of instructing the printer 200 to again form an image, the CPU 410 also generates a command including an execution request of the image formation (S36), and transmits the generated command to the printer 200 (S38).

Thereby, the user can instruct the printer 200 to again form an image by a voice instruction, which is convenient.

After transmitting the command, the CPU 410 also transmits voice data pronouncing that the printer 200 is instructed to again form an image to the smart speaker 300 via the network IF 480.

Thereby, the user can know by voice that the instructed content is instructed to the printer 200, which is convenient.

The CPU 410 also transmits and receives data including the command to and from the printer 200 via the repeater 100 connected via the network IF 480 and configured to perform P2P communication with the printer 200.

Thereby, even though the printer 200 is not provided with a network IF, the printer 200 can transmit and receive data to and from the application server 400 via the repeater 100.

The application server 400 in accordance with another aspect of the present embodiment includes the network IF 480, the storage unit 420, and the CPU 410. The CPU 410 executes voice content recognition processing of recognizing a content of voice input by utterance of the user of the printer 200, from the smart speaker 300 connected via the network IF 480 and configured to input and output voice, and when the recognized content of voice includes a term relating to a setting of the printer 200, acquisition processing of acquiring a print setting of the printer 200 from the printer 200, and log information storing processing of associating the recognized content of voice with the acquired print setting of the printer 200 to store the associated information in the storage unit 420 as log information relating to the setting of the printer 200.

In this way, in the application server 400 of the present embodiment, it is possible to collect the wide range of user's tastes and desires, as a log.

Additionally, in the present embodiment, the application server 400 is an example of the "information processing apparatus". The network IF 480 is an example of the "communication interface". The storage unit 420 is an example of the "storage device". The CPU 410 is an example of the "controller". The printer 200 is an example of the "image forming apparatus". The print setting is an example of the "setting information".

In the log information storing processing, print application information that instructs the printer 200 on printing is also stored as the log information relating to the setting of the printer 200, in addition to the print setting of the printer 200. Thereby, the wide range of user's tastes and desires relating to the print application can also be collected as a log. Additionally, the print is an example of the "image formation". The print application information is an example of the "application information".

In the log information storing processing, model information about the printer 200 is also stored as the log information relating to the setting of the printer 200, in addition to the print setting of the printer 200. Thereby, the wide range of user's tastes and desires for each model of the printer 200 can also be collected as a log. Additionally, the model information is an example of the "device information".

In the log information storing processing, when the recognized content of voice does not include a term relating to the setting of the printer 200, the recognized content of voice and the acquired print setting of the printer 200 are associated with each other to be stored in the storage unit 420 as log information not relating to the setting of the printer 200. Thereby, the wide range of user's tastes and desires including the voice content not relating to the setting of the printer 200 can be collected as a log.

The print setting of the printer 200 includes settings of a plurality of setting items, and in the log information storing processing, the recognized content of voice and one of the settings of the plurality of setting items relating to the recognized content of voice are associated with each other to be stored in the storage unit 420 as the log information relating to the setting of the printer 200. Thereby, the wide range of user's tastes and desires can also be collected as a log while narrowing the setting items.

In the log information storing processing, when the recognized content of voice includes a term indicative of a degree, the term indicative of a degree is also stored in the storage unit 420 as the log information relating to the setting of the printer 200. Thereby, the wide range of user's tastes and desires including a degree can also be collected as a log. Additionally, "I want a deeper result" and "It is still pale" are examples of the "degree".

Note that, the present invention is not limited to the above-described embodiment, and can be diversely changed without departing from the gist thereof.

(1) In the above embodiment, the processing of analyzing the voice data is executed by the voice analysis processing unit 424a' of the application server 400. Instead, some or all of the processing of analyzing the voice data may also be executed by the smart speaker 300. Some or all of the processing of analyzing the voice data may also be executed by the print-related processing unit 424b'. For example, the voice analysis processing unit 424a' may execute only the processing of executing the voice recognition processing to generate the text data, and the print-related processing unit 424b' may execute the morpheme analysis processing of extracting words.

(2) In the above embodiment, as the image forming apparatus, the printer 200 is adopted. However, the present invention is not limited. For example, a complex machine having a scan function and a facsimile function in addition to a print function may also be adopted. In this case, for example, the complex machine may be caused to perform printing, in response to the voice input to the smart speaker 300.

(3) The application server 400 is a cloud server but may also be a local server that is connected to the LAN 70 and is not connected to the Internet 80. In this case, only the voice data may be transmitted without transmitting the identification information such as a user ID from the smart speaker 300 to the application server 400.

(4) The interface for connecting the repeater 100 and the printer 200 each other is not limited to the Bluetooth IF 160. For example, a wired interface such as a USB, and other wireless interface such as NFC (an abbreviation of Near field communication) may also be possible.

(5) In the above embodiment, the repeater 100 is configured to relay data that is transmitted and received between the application server 400 and the printer 200 but may also be configured to relay data via the smart speaker 300 between the repeater and the application server 400. In this case, communication using the Bluetooth IF 160 or the wireless LAN IF 180 of the smart speaker 300 is performed with the repeater 100. When the printer 200 is provided with a wireless LAN IF, the application server 400 may directly communicate with the printer 200 without passing through the repeater 100 or the application server 400 may communicate with the printer 200 via the smart speaker 300.

(6) In the above embodiment, some of configurations implemented by hardware may be replaced with software. To the contrary, some of configurations implemented by software may be replaced with hardware.

What is claimed is:

1. An information processing apparatus comprising:
   a communication interface; and
   a controller,
   wherein the controller is configured to recognize a content of voice input by utterance of a user of an image forming apparatus, the voice obtained from a smart speaker connected via the communication interface and configured to input and output voice, and
   in a case where the recognized content of voice is a content indicative of a user's dissatisfaction or request for an image which has been formed by the image forming apparatus, the controller is configured to:
      execute processing for determining an item of a setting parameter and a value thereof to be changed in the image forming apparatus, based on the recognized content of voice;
      generate a command including the determined item and value of the setting parameter; and
      transmit the generated command to the image forming apparatus.

2. The information processing apparatus according to claim 1, wherein the controller is configured to:
acquire a current setting value of the determined setting parameter item in the image forming apparatus from the image forming apparatus; and
determine a value of the determined setting parameter item, based on the acquired current setting value and the recognized content of voice.

3. The information processing apparatus according to claim 2,
wherein the controller is configured to compare a settable maximum or minimum value of the determined setting parameter item and the acquired current setting value before determining a value of the determined setting parameter item, and to transmit voice data pronouncing a range of values, which is possible to be added to or subtracted from the current setting value, to the smart speaker via the communication interface, and
in a case where the user pronounces a value to be added to or subtracted from the current setting value in response to the voice data, the controller is configured to:
recognize a value to be added to or subtracted from the current setting value; and
determine, as a value of the determined setting parameter item, a value obtained by adding or subtracting the recognized value to or from the current setting value.

4. The information processing apparatus according to claim 2,
wherein in a case where the controller cannot acquire the current setting value from the image forming apparatus, the controller is configured to transmit voice data pronouncing that the current setting value cannot be acquired to the smart speaker via the communication interface.

5. The information processing apparatus according to claim 1,
wherein in a case where the recognized content of voice is a content of instructing the image forming apparatus to again form an image, the controller is configured to:
generate a command including an execution request of the image formation; and
transmit the generated command to the image forming apparatus.

6. The information processing apparatus according to claim 5,
wherein after the controller transmits the command, the controller is configured to transmit voice data pronouncing that the image forming apparatus is instructed to again form an image to the smart speaker via the communication interface.

7. The information processing apparatus according to claim 1,
wherein the controller is configured to transmit and receive data including the command to and from the image forming apparatus via a repeater connected via the communication interface and configured to perform P2P communication with the image forming apparatus.

8. The information processing apparatus according to claim 1,
wherein in a case where text data of the input voice is "Make it a little deeper", the controller is configured to:
extract "a litter", "deeper" and "make it";
recognize a degree from the extracted "a litter";
recognize a density from the extracted "deeper";
recognize that a density is to be made deeper, from the extracted "make it"; and
determine a density item of an image as the item of the setting parameter and a value making a density of the image increased as the value of the setting parameter, based on the recognized content of voice.

9. A non-transitory computer-readable storage medium storing a computer program, when executed by a computer of an information processing apparatus comprising a communication interface, the computer program being configured to cause the information processing apparatus to:
recognize a content of voice input by utterance of a user of an image forming apparatus, the voice obtained from a smart speaker connected via the communication interface and configured to input and output voice;
in a case where the recognized content of voice is a content indicative of a user's dissatisfaction or request for an image which has been formed by the image forming apparatus,
determine an item of a setting parameter and a value thereof to be changed in the image forming apparatus, based on the recognized content of voice;
generate a command including the determined item and value of the setting parameter; and
transmit the generated command to the image forming apparatus.

10. An information processing apparatus comprising:
a communication interface;
a storage device; and
a controller,
wherein the controller is configured to recognize a content of voice input by utterance of a user of an image forming apparatus, the voice obtained from a smart speaker connected via the communication interface and configured to input and output voice, and
in a case where the recognized content of voice includes a term relating to a setting of the image forming apparatus, the controller is configured to:
acquire setting information of the image forming apparatus from the image forming apparatus; and
associate the recognized content of voice with the acquired setting information of the image forming apparatus to store the associated information in the storage device as log information relating to a setting of the image forming apparatus.

11. The information processing apparatus according to claim 10,
wherein the controller is configured to store information of an application that instructs the image forming apparatus on image formation as the log information relating to the setting of the image forming apparatus, in addition to the setting information of the image forming apparatus.

12. The information processing apparatus according to claim 10,
wherein the controller is configured to store device information about the image forming apparatus as the log information relating to the setting of the image forming apparatus, in addition to the setting information of the image forming apparatus.

13. The information processing apparatus according to claim 10,
wherein in a case where the recognized content of voice does not include a term relating to the setting of the image forming apparatus, the controller is configured to associate the recognized content of voice with the acquired setting information of the image forming apparatus to store the associated information in the storage device as log information not relating to the setting of the image forming apparatus.

14. The information processing apparatus according to claim 10,
wherein the setting information of the image forming apparatus includes settings of a plurality of setting items, and
the controller is configured to associate the recognized content of voice with one of the settings of the plurality of setting items relating to the recognized content of voice to store the associated information in the storage device as the log information relating to the setting of the image forming apparatus.

15. The information processing apparatus according to claim 10,
wherein in a case where the recognized content of voice includes a term indicative of a degree, the controller is configured to also store the term indicative of a degree in the storage device as the log information relating to the setting of the image forming apparatus.

16. A non-transitory computer-readable storage medium storing a computer program, when executed by a computer of an information processing apparatus comprising a communication interface and a storage device, the computer program being configured to cause the information processing apparatus to:
recognize a content of voice input by utterance of a user of an image forming apparatus, the voice obtained from a smart speaker connected via the communication interface and configured to input and output voice;
in a case where the recognized content of voice includes a term relating to a setting of the image forming apparatus,
acquire setting information of the image forming apparatus from the image forming apparatus; and
associate the recognized content of voice with the acquired setting information of the image forming apparatus to store the associated information in the storage device as log information relating to a setting of the image forming apparatus.

* * * * *